(12) United States Patent  (10) Patent No.: US 7,798,409 B2
Madej et al.  (45) Date of Patent: Sep. 21, 2010

(54) READING FAILURE PREVENTION IN IMAGING READERS

(75) Inventors: Dariusz J. Madej, Shoreham, NY (US); Xiaomei Wang, Port Jefferson Station, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 276 days.

(21) Appl. No.: 11/823,820

(22) Filed: Jun. 28, 2007

(65) Prior Publication Data

US 2009/0001172 A1  Jan. 1, 2009

(51) Int. Cl.
 *G06K 7/10* (2006.01)
(52) U.S. Cl. .................. 235/462.31; 235/462.07; 235/462.16
(58) Field of Classification Search ......... 235/462, 235/462.41
 See application file for complete search history.

(56) References Cited

U.S. PATENT DOCUMENTS

| | | | |
|---|---|---|---|
| 4,251,798 A | 2/1981 | Swartz et al. | |
| 4,613,895 A | 9/1986 | Burkey et al. | |
| 5,534,684 A * | 7/1996 | Danielson | 235/472.02 |
| 5,561,283 A | 10/1996 | Dvorkis et al. | |
| 5,635,697 A | 6/1997 | Shellhammer et al. | |
| 5,659,167 A * | 8/1997 | Wang et al. | 235/472.01 |
| 5,703,349 A | 12/1997 | Meyerson et al. | |
| 6,060,722 A | 5/2000 | Havens et al. | |
| 6,069,748 A | 5/2000 | Bietry | |
| 7,182,260 B2 | 2/2007 | Gurevich et al. | |
| 2006/0180669 A1* | 8/2006 | Hara | 235/462.07 |
| 2007/0199992 A1* | 8/2007 | Manheim | 235/462.01 |

* cited by examiner

*Primary Examiner*—Daniel A Hess
*Assistant Examiner*—Tabitha Chedekel

(57) ABSTRACT

In an imaging reader for reading a coded symbol located in a range of working distances from the reader, a solid-state imager captures light from the symbol over a field of view, and a controller automatically determines whether an image of the symbol is located entirely within the field of view of the imager, and processes the symbol only when the symbol image is located entirely within the field of view of the imager.

14 Claims, 3 Drawing Sheets

READING FAILURE PREVENTION IN IMAGING READERS

BACKGROUND OF THE INVENTION

Optical codes or dataforms are patterns made up of image areas having different light-reflective or light-emissive properties, which are typically arranged in accordance with a priori rules and symbologies. The optical properties and patterns of the codes are selected to distinguish them in appearance from the background environments in which they are used. Electro-optical readers identify or extract data from the codes and are used in both fixed or portable installations in many diverse environments such as in stores for check-out services, in manufacturing locations for work flow and inventory control, and in transport vehicles for tracking package handling. The code is used as a rapid, generalized means of automatic data entry.

Many conventional readers are designed to read bar code symbols. Originally, symbols stored data in the widths and spacings of printed parallel lines, but more recently, symbols consist of patterns of dots and concentric circles, and are hidden within images. A one-dimensional bar code symbol consists of a linear pattern of variable-width rectangular bars separated by fixed or variable width spaces. The bars and spaces have different light-reflecting characteristics. One example of a one-dimensional bar code symbol is the UPC/EAN code used to identify, for example, product inventory. An example of a stacked bar code symbol is a PDF417 barcode, which is disclosed in U.S. Pat. No. 5,635,697. An example of a two-dimensional code is known as "MaxiCode", which consists of a central finder or bull's eye center and a grid of hexagons surrounding the central finder.

A conventional moving laser beam-based reader is typically hand-held and generates a visible laser beam that is manually aimed by a user at a symbol to be read. The laser beam-based reader sweeps the laser beam and generates one or more visible scan lines in a scan pattern across the symbol that is located anywhere in a range of working distances from the reader. A light detector senses return laser light of variable intensity reflected or scattered from the symbol over each scan line, and generates a continuous analog signal corresponding to the light reflected or scattered from the symbol along each scan line. Signal processing circuitry includes a digitizer for converting the analog signal into a digital signal, and a programmed microprocessor for then decoding the digital signal to extract information from the symbol, such as an identity of an item with which the symbol is associated. A laser-based reader of this general type is disclosed, for example, in U.S. Pat. No. 4,251,798. A reader for detecting, decoding and reading one- and two-dimensional symbols is also disclosed in U.S. Pat. No. 5,561,283.

Both one- and two-dimensional symbols can also be read by employing solid-state imagers to capture an image of each symbol, instead of moving a laser beam across each symbol in a scan pattern. For example, the imager may comprise a one- or two-dimensional array of cells or photosensors, which correspond to image elements or pixels in a field of view of the imager. Such an array may be comprised of a one- or two-dimensional charge coupled device (CCD) or a complementary metal oxide semiconductor (CMOS) device, analogous to those devices used in a digital camera to capture images. The imager further includes electronic circuitry for producing electrical signals indicative of the light captured by the array, and a microprocessor for processing the electrical signals to produce each captured image.

It is therefore known to use a CCD for capturing a monochrome image of a bar code symbol to be read as, for example, disclosed in U.S. Pat. No. 5,703,349. It is also known to use a CCD with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

Although generally satisfactory for its intended purpose of reading symbols, the use of an imager-based or imaging reader can be frustrating, because a user cannot tell whether the imager, or its field of view, or a hand-held housing in which the imager is mounted, is aimed directly at the target symbol such that the entire symbol can be read. The symbol can be located anywhere within a range of working distances toward and away from the reader, and/or above and below the reader, and/or sideways from the reader. Contrary to moving laser beam-based readers in which the user can see the laser beam as at least one visible scan line or visible aiming mark on the symbol, the imager is a passive unit and provides no precise visual feedback to the user to advise where the symbol is located in a captured image, and whether or not the symbol is entirely located within the field of view of the imager.

Electro-optical laser beam-based and imaging readers are both susceptible to so-called "short reads" of certain symbols. A short read is a mis-decode or mis-read, which happens when a fragment of the bar code symbol is decoded instead of the entire bar code symbol. For example, a symbol "ABCDEFG" is a short read if only its left fragmentary part "ABCDE", or only its right fragmentary part "BCDEFG", is decoded. Codabar, D2F, and MSI (with one check digit) symbologies are just some examples of less secure one-dimensional symbols or so-called "weak" symbols that can be short read. In order to decrease the chance of a mis-decode, the length of the symbol can be fixed or limited to a number of values, e.g., only eight character symbols are allowed, or in another example symbols having between five and seven characters are allowed.

However, information concerning the length of the symbol cannot be always determined in advance. The chance of a mis-decode in the imaging reader is increased by the fact that the symbol might only be partially included in the field of view of the imager, thereby leading to short reads. As noted above, the user does not have precise feedback, if any, about the location of the field of view of the imager relative to the symbol, as compared to the situation in a laser beam-based reader in which the user can see, aim and position the visible scan line across the entire length of the symbol. Thus, either due to parallax, careless aiming of the imaging reader, or simply pressing a trigger when moving the imaging reader, an image where the bar code symbol is only partially included in the image can be obtained. If the symbology is weak, as noted above, then an incorrect read typically occurs.

To alleviate such problems, the prior art proposed in U.S. Pat. No. 6,060,722 an aiming light pattern generator for an imaging reader. This known generator utilizes a diffractive element, a holographic element, or a Fresnel element, which generates a light interference pattern useful for framing the field of view. It is also known to use non-interferometric optical elements to project an aiming line as described in U.S. Pat. No. 6,069,748, which disclosed the use of a toroidal lens to project a single aiming line to guide a cutting tool. U.S. Pat. No. 7,182,260 disclosed the use of an optical element having a plurality of refractive structures to generate a light pattern on a symbol for framing the field of view of an imager.

However, the known light pattern generators produce patterns that are not well visible in high ambient light conditions, such as bright sunlight. Also, the known light pattern generators consume appreciable electrical power that is undesirable for a battery-powered imaging reader, occupy a non-negligible volume within the reader, and add undesirable weight to the reader.

SUMMARY OF THE INVENTION

One feature of the present invention resides, briefly stated, in an imaging reader for, and a method of, electro-optically reading a target, such as one-dimensional bar code symbols, located in a range of working distances from the reader. The arrangement includes a solid-state imager including an array of image sensors for capturing light from the target in the range of working distances over a field of view. Such an imager may be a one- or two-dimensional charge coupled device (CCD) or a complementary metal oxide semiconductor (CMOS) device.

In accordance with one aspect of this invention, a controller is provided for automatically determining whether an image of the symbol is located entirely within the field of view of the imager, and for processing the symbol only when the symbol image is located entirely within the field of view of the imager. This aspect reduces the chance of a short read and a mis-decode, especially of a weak symbol attempted to be read by the imaging reader. As noted above, the user of the imaging reader does not have precise feedback, if any, about the location of the field of view of the imager relative to the symbol. Thus, an image where the bar code symbol is only partially included in the field of view is avoided can be obtained.

In one embodiment, the controller is operative for determining symbol boundaries of the symbol image, and for processing the symbol image when the symbol boundaries are located within the field of view by predetermined margin distances. The symbol has elements of various widths, and each predetermined margin distance is preferably a multiple of a width of a narrowest element of the symbol. More particularly, the controller is operative for determining margin distances between the symbol boundaries and field boundaries of the field of view, and for processing the symbol image when the symbol boundaries are spaced from the field boundaries by the predetermined margin distances. The symbol boundaries form a virtual box surrounding the symbol image, and the field boundaries form a generally quadrilateral outline in which the virtual box is contained.

In another embodiment, the controller is operative for determining end points of a virtual scan line extending along the symbol image, and for processing the symbol image when the end points are located within the field of view by predetermined margin distances. As before, the symbol has elements of various widths, and each predetermined margin distance is a multiple of a width of a narrowest element of the symbol. The controller is operative for determining margin distances between the end points and field boundaries of the field of view, and for processing the symbol image when the end points are spaced from the field boundaries by the predetermined margin distances.

In accordance with another aspect of this invention, the method of electro-optically reading a coded symbol, comprising the steps of capturing light from the symbol with a solid-state imager having an array of image sensors over a field of view; and automatically determining whether an image of the symbol is located entirely within the field of view of the imager, and processing the symbol only when the symbol image is located entirely within the field of view of the imager.

Symbol boundaries of the symbol image are determined, and the symbol image is processed when the symbol boundaries are located within the field of view by predetermined margin distances. Each predetermined margin distance is configured as a multiple of a width of a narrowest element of the symbol. The margin distances are determined between the symbol boundaries and field boundaries of the field of view, and the symbol image is processed when the symbol boundaries are spaced from the field boundaries by the predetermined margin distances. The symbol image is surrounded by the symbol boundaries to form a virtual box, and the field boundaries are formed with a generally quadrilateral outline in which the virtual box is contained.

Alternately, the end points of a virtual scan line extending along the symbol image are determined, and the symbol image is processed when the end points are located within the field of view by predetermined margin distances. The margin distances between the end points and field boundaries of the field of view are determined, and the symbol image is processed when the end points are spaced from the field boundaries by the predetermined margin distances.

It is easy to implement this method, which rapidly determines whether the symbol image is located entirely within the field of view of the imager. This method is an effective, reliable measure for preventing short reads and mis-decodes in an imaging reader, without using complex, power-consuming, large, and heavy aiming light generators.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
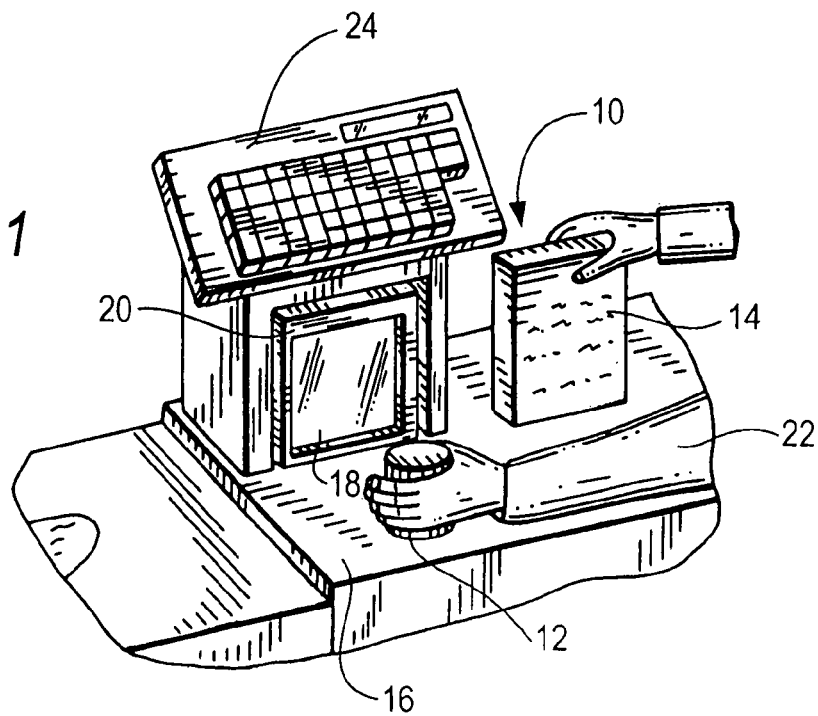
FIG. 1 is a perspective view of a point-of-transaction workstation operative for capturing light from targets.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a generally planar support surface or countertop 16 across which the products are slid at a swipe speed past a generally vertical window 18 of a box-shaped, vertical slot, portable imaging reader 20 mounted on the countertop 16 in a hands-free mode of operation. A checkout clerk or operator 22 is located at one side of the countertop, and the imaging reader 20 is located at the opposite side. A cash/credit register 24 is located within easy reach of the operator. In the frequent event that large, heavy, or bulky products, that cannot easily be brought to the reader 20, have target symbols that are required to be read, then the operator 22 may also manually grasp the portable reader 20 and lift it off, and remove it from, the countertop 16 for reading the target symbols in a hand-held mode of operation. The reader need not be box-shaped as illustrated, but could have virtually any housing configuration, such as a gun shape.

Figure 2:
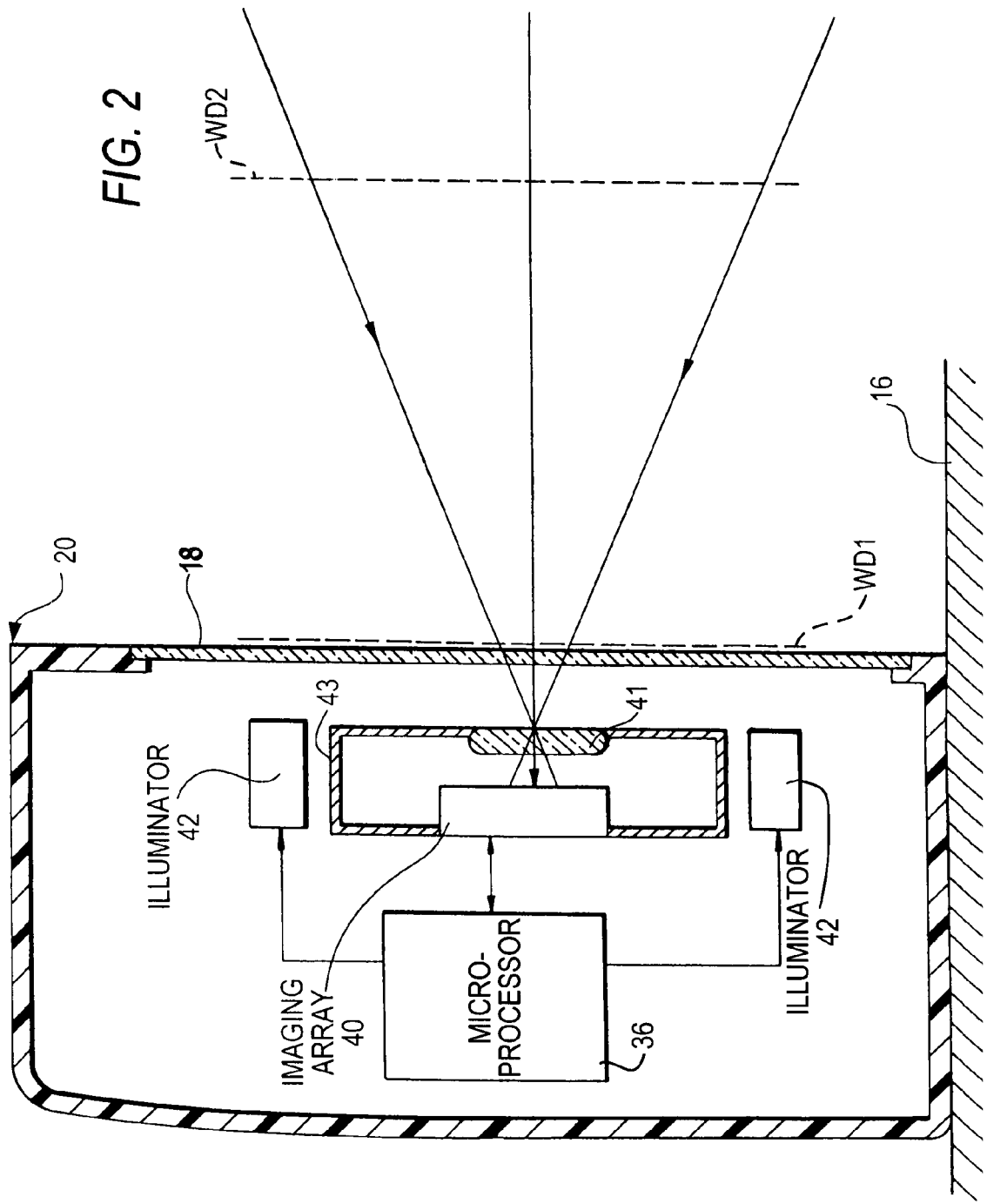
FIG. 2 is a schematic block diagram of various components of an imaging reader used in the workstation of FIG. 1 in accordance with the present invention.

As shown in FIG. 2, the portable imaging reader 20 includes an imager 40 and a focusing lens 41 mounted in an enclosure 43. The imager or imaging array 40 is a solid-state device, for example, a CCD or a CMOS imager and has a one- or two-dimensional array of addressable image sensors arranged in mutually orthogonal multiple rows and columns, and operative for capturing return light through the window 18 from a target, e.g., a one-dimensional symbol, over a field of view and located anywhere in a working range of distances between a close-in working distance (WD1) and a far-out working distance (WD2). The focusing lens 41 focuses the return light onto the imager. Typically, WD1 is about two inches from the imager 40 and generally coincides with the window 18, and WD2 lies within a range of a few inches to many inches from the window 18. A suitable imager is disclosed in U.S. Pat. No. 5,965,875. An illuminator 42 is also mounted in the reader and preferably includes one or a plurality of light sources, e.g., light emitting diodes (LEDs) arranged around the imager 40, to uniformly illuminate the target.

As also shown in FIG. 2, the imager 40 and the illuminator 42 are operatively connected to a controller or microprocessor 36 operative for controlling the operation of these components. Preferably, the microprocessor is the same as the one used for decoding light scattered from the target symbol and for processing the captured target images.

In operation, the microprocessor 36 sends a command signal to the illuminator 42 to pulse the LEDs for a short time period of about 500 microseconds or less, and energizes the imager 40 to collect light from a target substantially only during said time period. A typical array needs about 33 milliseconds to read the entire target image and operates at a frame rate of about 30 frames per second. The array may have on the order of one million addressable image sensors.

Figure 3:
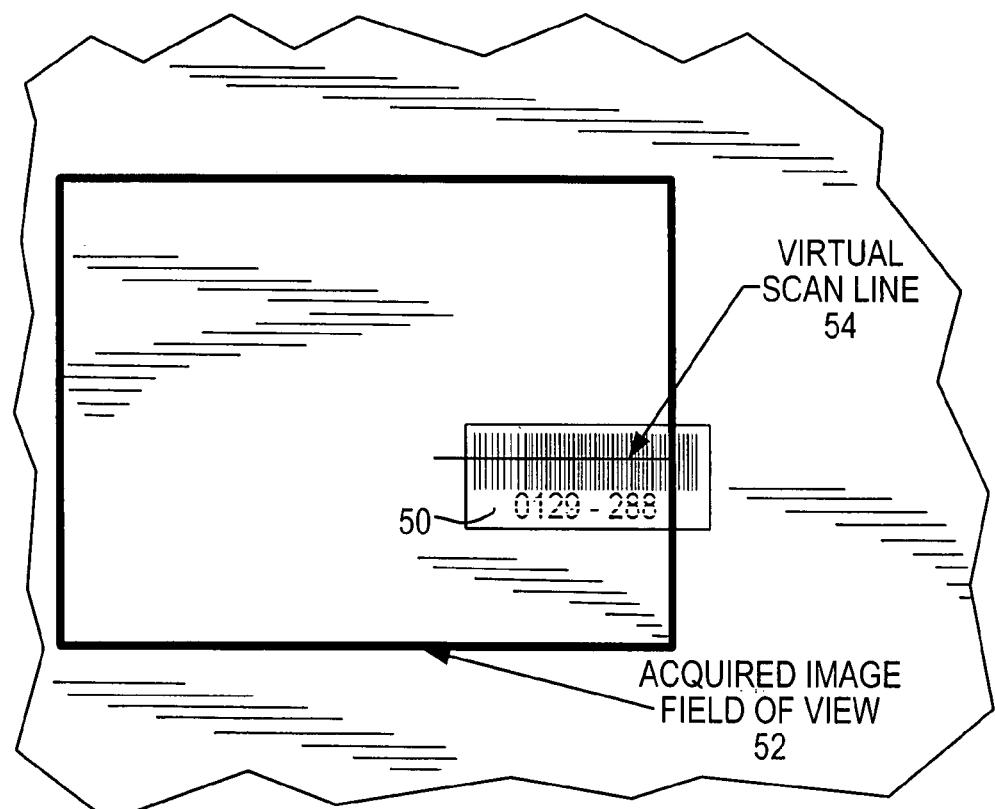
FIG. 3 is a schematic depiction of a short read during use of the imaging reader of FIG. 2.

As discussed above, the imaging reader 20 is susceptible to a short read when a fragment of the bar code symbol is decoded, instead of the entire bar code symbol. This is shown in FIG. 3, which contains an image of a weak symbol, i.e., an MSI bar code symbol 50 with one check digit. A rectangle 52 illustrates the field of view of the imager 40. Only a fragment of the bar code symbol 50 is shown as being included in the field of view containing the recorded image sent to the controller 36 (decoder), rather than an image of the entire bar code symbol 50. At least one of the rows of sensors in the imager senses the light transitions indicative of a symbol, and this at least one row is schematically depicted in FIG. 3 as a "virtual scan line" 54 extending across the bar code symbol. The at least one row of sensors generates an electrical analog signal indicative of the variable light intensity across the symbol, and the controller converts the analog signal to a digital signal, and then decodes the digital signal in accordance with a stored algorithm accessed by the controller. Decoding the symbol fragment results in a mis-decode or mis-read of the symbol.

Unfortunately, as discussed above, the user does not know whether the entire symbol is or is not entirely located in the field of view, because the user has no feedback about the location of the field of view of the imager relative to the symbol, in contrast to the situation in a laser beam-based reader in which the user can see, aim and position the visible scan line across the entire length of the symbol.

Hence, one feature of this invention provides that the controller 36 is operative for automatically determining whether an image of the symbol is located entirely within the field of view of the imager 40, and for processing the symbol only when the symbol image is located entirely within the field of view of the imager 40. This feature reduces the chance of a short read and a mis-decode, especially of a weak symbol attempted to be read by the imaging reader.

Figure 4:
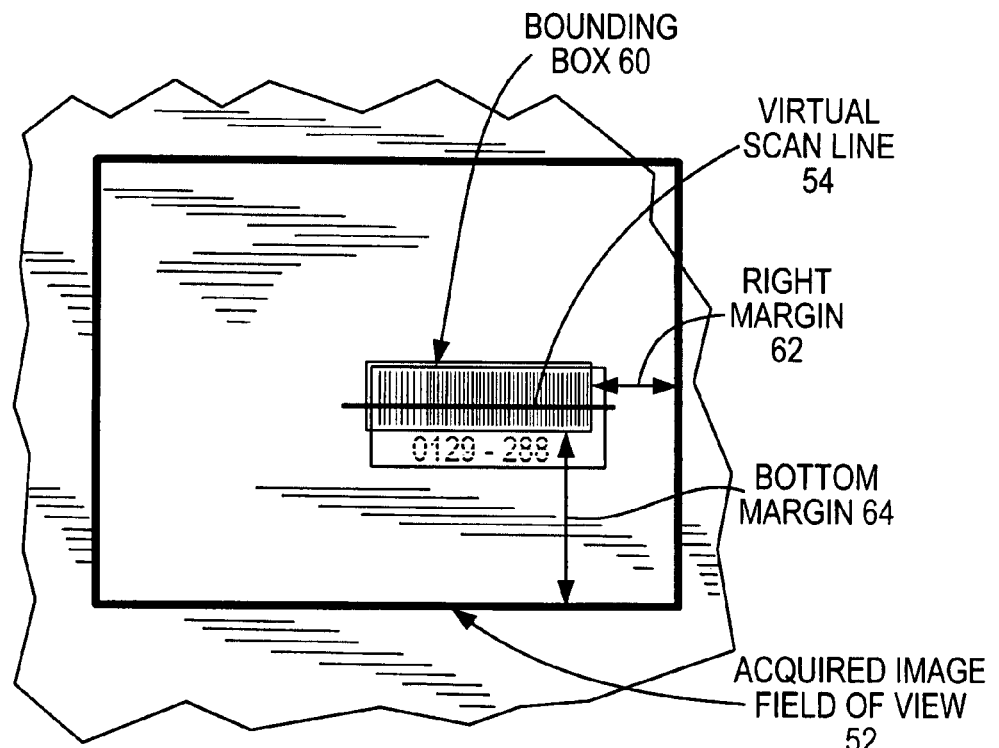
FIG. 4 is a schematic depiction analogous to FIG. 3 of one embodiment of the present invention in which an image of the symbol is located entirely within the field of view of an imager in the reader of FIG. 2.

In one embodiment, as shown in FIG. 4, the controller 36 is operative for determining symbol boundaries 60 of the symbol image, and for processing the symbol image when the symbol boundaries 60 are located within the field of view 52 by predetermined margin distances, such as the illustrated right margin 62, the illustrated bottom margin 64, the non-illustrated left margin, and the non-illustrated top margin. The symbol 50 has elements of various widths, and each predetermined margin distance is preferably a multiple of a width of a narrowest element of the symbol.

More particularly, the controller 36 is operative for determining margin distances between the symbol boundaries 60 and field boundaries of the field of view 52, and for processing the symbol image when the symbol boundaries 60 are spaced from the field boundaries by the predetermined margin distances. A plurality of the rows of sensors in the imager senses the light transitions indicative of a symbol, and one of the rows 54 is schematically depicted in FIG. 4 as a "virtual scan line" 54 extending across the bar code symbol. The sensors detect where the symbol exists, and where it does not exist. The symbol boundaries form a virtual or bounding box surrounding the symbol image and define the area in which the symbol 50 exists. The field boundaries form a generally quadrilateral outline in which the bounding box 60 is contained. All of the margin distances should be greater than zero and preferably at least equal to the predetermined margin distances.

Figure 5:
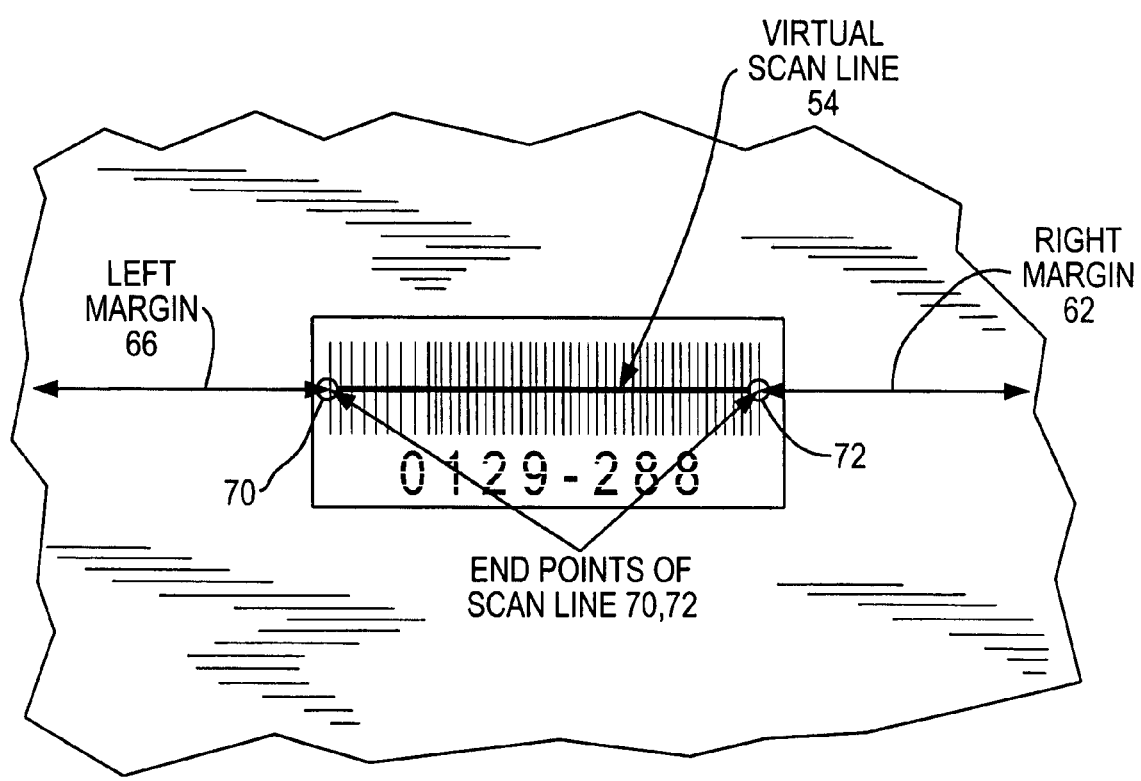
FIG. 5 is a close-up schematic depiction analogous to FIG. 3 of another embodiment of the present invention in which an image of the symbol is located entirely within the field of view of an imager in the reader of FIG. 2.

In another embodiment, as shown in FIG. 5, the controller 36 is operative for determining end points 70, 72 of the virtual scan line 54 extending along the symbol image, and for processing the symbol image when the end points 70, 72 are located within the field of view by predetermined margin distances. As before, the symbol has elements of various widths, and each predetermined margin distance is a multiple of a width of a narrowest element of the symbol. The controller 36 is operative for determining margin distances, such as right margin 62 and left margin 66, between the end points 70, 72 and field boundaries of the field of view 52, and for processing the symbol image when the end points 70, 72 are spaced from the field boundaries by the predetermined margin distances.

Hence, the controller 36 will accept decoding only if the symbol boundaries or end points are located within a certain margin inside the image. Each symbology, or a variant of a symbology, would be assessed a priori whether the proposed feature of automatically determining whether the symbol image is entirely located within the field of view is required or not. For example, it would not be required for secure one-dimensional symbologies, like Code 128 and some versions of weaker symbologies, e.g., MSI with two check digits. It would be required for weak symbologies, e.g., MSI with one check digit.

It is easy to implement these embodiments, which rapidly determine whether the symbol image is located entirely within the field of view of the imager 40. This method is an effective, reliable measure for preventing short reads and mis-decodes in an imaging reader, without using complex, power-consuming, large, and heavy aiming light generators.

It will be understood that each of the elements described above, or two or more together, also may find a useful application in other types of constructions differing from the types described above.

While the invention has been illustrated and described as embodied in preventing short reads of symbols in an imaging reader and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An imaging reader for electro-optically reading a coded symbol, comprising:
    a solid-state imager including an array of image sensors for capturing light from the symbol over a field of view;
    a controller for automatically determining whether an image of the symbol is located entirely within the field of view of the imager, and for processing the symbol only when the symbol image is located entirely within the field of view of the imager;
    wherein the controller is operative for determining symbol boundaries of the symbol image, and for processing the symbol image when the symbol boundaries are located within the field of view by predetermined margin distances that are selected based on the symbology of the coded symbol.

2. The reader of claim 1, wherein the symbol has elements of various widths, and wherein each predetermined margin distance is a multiple of a width of a narrowest element of the symbol.

3. The reader of claim 1, wherein the controller is operative for determining margin distances between the symbol boundaries and field boundaries of the field of view, and for processing the symbol image when the symbol boundaries are spaced from the field boundaries by the predetermined margin distances.

4. The reader of claim 3, wherein the symbol boundaries form a virtual box surrounding the symbol image, and wherein the field boundaries form a generally quadrilateral outline in which the virtual box is contained.

5. The reader of claim 1, wherein the controller is operative for determining end points of a virtual scan line extending along the symbol image, and for processing the symbol image when the end points are located within the field of view by predetermined margin distances.

6. The reader of claim 5, wherein the symbol has elements of various widths, and wherein each predetermined margin distance is a multiple of a width of a narrowest element of the symbol.

7. The reader of claim 5, wherein the controller is operative for determining margin distances between the end points and field boundaries of the field of view, and for processing the symbol image when the end points are spaced from the field boundaries by the predetermined margin distances.

8. A method of electro-optically reading a coded symbol, comprising the steps of:
    capturing light from the symbol with a solid-state imager having an array of image sensors over a field of view;
    automatically determining whether an image of the symbol is located entirely within the field of view of the imager, and processing the symbol only when the symbol image is located entirely within the field of view of the imager; and
    wherein the determining step is performed by determining symbol boundaries of the symbol image, and wherein the processing step is performed by processing the symbol image when the symbol boundaries are located within the field of view by predetermined margin distances that are selected based on the symbology of the coded symbol.

9. The method of claim 8, and configuring the symbol with elements of various widths, and configuring each predetermined margin distance as a multiple of a width of a narrowest element of the symbol.

10. The method of claim 8, wherein the determining step is performed by determining margin distances between the symbol boundaries and field boundaries of the field of view, and wherein the processing step is performed by processing the symbol image when the symbol boundaries are spaced from the field boundaries by the predetermined margin distances.

11. The method of claim 10, wherein the determining step is performed by surrounding the symbol image with the symbol boundaries to form a virtual box, and forming the field boundaries with a generally quadrilateral outline in which the virtual box is contained.

12. The method of claim 8, wherein the determining step is performed by determining end points of a virtual scan line extending along the symbol image, and wherein the processing step is performed by processing the symbol image when the end points are located within the field of view by predetermined margin distances.

13. The method of claim 12, and configuring the symbol with elements of various widths, and configuring each predetermined margin distance as a multiple of a width of a narrowest element of the symbol.

14. The method of claim 12, wherein the determining step is performed by determining margin distances between the end points and field boundaries of the field of view, and wherein the processing step is performed by processing the symbol image when the end points are spaced from the field boundaries by the predetermined margin distances.

* * * * *